(12) United States Patent
Zito et al.

(10) Patent No.: US 11,635,099 B1
(45) Date of Patent: Apr. 25, 2023

(54) RETAINING APPARATUS

(71) Applicants: Joseph A Zito, Bolingbrook, IL (US); William O Ernest, Bolingbrook, IL (US)

(72) Inventors: Joseph A Zito, Bolingbrook, IL (US); William O Ernest, Bolingbrook, IL (US)

( * ) Notice: Subject to any disclaimer, the term of this patent is extended or adjusted under 35 U.S.C. 154(b) by 52 days.

(21) Appl. No.: 17/029,362

(22) Filed: Sep. 23, 2020

Related U.S. Application Data

(60) Provisional application No. 62/973,452, filed on Oct. 7, 2019.

(51) Int. Cl.
*F16B 2/22* (2006.01)
*F16B 5/06* (2006.01)

(52) U.S. Cl.
CPC ............. *F16B 2/22* (2013.01); *F16B 5/0635* (2013.01)

(58) Field of Classification Search
CPC ...... F16B 2/22; F16B 5/0635; Y10T 24/1467; B65D 63/06
See application file for complete search history.

(56) References Cited

U.S. PATENT DOCUMENTS

| | | | | |
|---|---|---|---|---|
| 3,459,096 A | * | 8/1969 | Parkin | F16B 39/24 411/523 |
| 4,501,356 A | * | 2/1985 | Urban | B65D 63/08 206/83.5 |
| 4,512,159 A | * | 4/1985 | Memmen | F23R 3/60 60/752 |
| 4,793,753 A | * | 12/1988 | Muller | B25B 31/00 24/455 |
| 4,883,397 A | * | 11/1989 | Dubost | F16B 2/245 411/522 |

\* cited by examiner

*Primary Examiner* — Robert Sandy
*Assistant Examiner* — Rowland Do
(74) *Attorney, Agent, or Firm* — The Law Offices of Konrad Sherinian, LLC; Depeng Bi

(57) ABSTRACT

A retaining apparatus includes a short fold, a long fold, a tube connecting the short and long folds and forming a channel, and at least one enhanced engaging mechanism. The channel is approximately three hundred sixty degrees. The retaining apparatus is made of stainless steel. Each enhanced engaging mechanism includes a first bulge in the short fold, a first recess in the short fold, a second bulge in the long fold and a second recess in the long fold. The bulges and recesses correspond to each other. Each mechanism can be a female or male enhanced engaging mechanism. The first recess receives a portion of the second bulge, or the second recess receives a portion of the first bulge. The short and long folds are approximately parallel to each other. The height of the tube is bigger than the sum of the thicknesses of the short and long folds.

20 Claims, 3 Drawing Sheets

RETAINING APPARATUS

CROSS REFERENCE TO RELATED APPLICATIONS

This application claims the benefit and priority of U.S. Provisional Patent Application No. 62/973,452, entitled "RETAINING APPARATUS AND METHOD OF RETAINING REPLACEMENT WINDOW IN STRUCTURES", filed Oct. 7, 2019, which is hereby incorporated by reference in its entirety.

FIELD OF THE DISCLOSURE

The present invention generally relates to a retaining apparatus for attaching one object to another object, and more particularly relates to a retaining clip for engaging one object to another object. More particularly still, the present disclosure relates to a retaining clip with a set of enhanced engaging mechanisms for attaching a window cladding to a window structure for covering a window frame of the window structure.

DESCRIPTION OF BACKGROUND

Residential and commercial buildings each incorporate a set of windows. Generally, a window includes a window frame attached to a structure (such as a beam) of the building, a piece of transparent material (such as glass) and a glass attachment assembly for attaching the glass to the frame. The window frame is usually made of wood. Since the exterior side of the window is exposed to rain, snow, sunshine and other weather conditions, the window frame is exposed and susceptible to damages from natural conditions.

To protect the window frame, window cladding has been used to cover the window frame. Window cladding can be made of aluminum, vinyl or other types of materials. Window cladding provides numerous benefits, such as reducing maintenance necessary for a wood frame, requiring no painting, sealing or staining, providing an aesthetic effect to the exterior of the building, providing better insulation, improving energy efficiency, preventing water, snow, wind and other weather elements from penetrating the window frame, and preventing damages to the window frame. Conventionally, window cladding is attached to the window frame by stainless steel nails, which require more time and space to install, and make it very difficult to remove the window cladding from the window frame for, for example, replacement.

Accordingly, there is need for a new retaining apparatus for attaching window cladding to window frames. Furthermore, there is a need for a new retaining apparatus that requires less space and time for attaching window cladding to window frames than conventional solutions. In addition, there is a need for a new retaining apparatus that making removing window cladding from window frames an easy task.

SUMMARY OF THE DISCLOSURE

Generally speaking, pursuant to the various embodiments, the present disclosure provides a retaining clip. The retaining clip includes a short fold, a long fold facing the short fold in a parallel orientation, and a tube connecting the short fold and the long fold. The tube encloses a channel of approximately three hundred sixty degrees. The retaining clip also incudes a female enhanced engaging mechanism including a first bulge and a first recess in the short fold, and a second bulge and a second recess in the long fold. The second recess receives a portion of the first bulge. The first bulge, the first recess, the second bulge and the second recess are corresponding bulges and recesses. Moreover, the retaining clip includes a male enhanced engaging mechanism including a third bulge and a third recess in the short fold, and a fourth bulge and a fourth recess in the long fold. The third recess receives a portion of the fourth bulge. The first bulge and the third bulge extend away from the retaining clip in opposite directions. The third bulge, the third recess, the fourth bulge and the fourth recess are corresponding bulges and recesses. The female enhanced engaging mechanism and the male enhanced engaging mechanism are either parallel or unparallel enhanced engaging mechanisms. The retaining clip is made of stainless steel. In one implementation, the female enhanced engaging mechanism and the male enhanced engaging mechanism have the same shape and dimension. Alternatively, the first bulge is smaller than the second recess; and/or the fourth bulge is smaller than the third recess.

Further in accordance with the present teachings is a retaining clip. The retaining clip includes a short fold, a long fold facing the short fold in a parallel orientation and a tube connecting the short fold and the long fold. The tube encloses a channel of approximately three hundred sixty degrees. The retaining clip also includes a first enhanced engaging mechanism including a first bulge and a first recess in the short fold, and a second bulge and a second recess in the long fold. The first bulge, the first recess, the second bulge and the second recess are corresponding bulges and recesses. The retaining clip is made of stainless steel. The first bulge is smaller than the second recess in one implementation. Alternatively, the first bulge is identical to the second recess. The second recess receives a portion of the first bulge. Alternatively, the second recess does not receive a portion of the first bulge. The retaining clip further includes a second enhanced engaging mechanism including a third bulge and a third recess in the short fold, and a fourth bulge and a fourth recess in the long fold. The third recess receives a portion of the fourth bulge. The third bulge, the third recess, the fourth bulge and the fourth recess are corresponding bulges and recesses. The first enhanced engaging mechanism is a female enhanced engaging mechanism and the second enhanced engaging mechanism is a female enhanced engaging mechanism; the first enhanced engaging mechanism is a female enhanced engaging mechanism and the second enhanced engaging mechanism is a male enhanced engaging mechanism; the first enhanced engaging mechanism is a male enhanced engaging mechanism and the second enhanced engaging mechanism is a female enhanced engaging mechanism; or the first enhanced engaging mechanism is a male enhanced engaging mechanism and the second enhanced engaging mechanism is a male enhanced engaging mechanism. The first enhanced engaging mechanism and the second enhanced engaging mechanism are parallel enhanced engaging mechanisms. Alternatively, the first enhanced engaging mechanism and the second enhanced engaging mechanism are unparallel enhanced engaging mechanisms.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
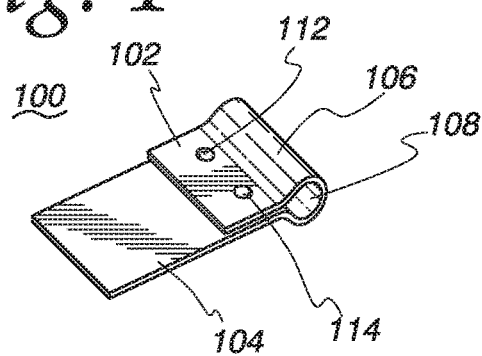
FIG. 1 is a front perspective view of a retaining apparatus in accordance with this disclosure.

Turning to the Figures and to FIG. 1 in particular, a front perspective view of a retaining clip is shown and generally indicated at 100. The new retaining apparatus 100 includes a top member 102, a bottom member 104, a tube 106 connecting the top and bottom members 102-104, and two enhanced engaging mechanisms 112 and 114. The tube portion 106 forms and encloses a channel 108 extending through the entire length of the tube 106. The length of the tube 106 is same as the width of the top and bottom members 102-104. In one embodiment, the length of the top member 102 is shorter than that of the bottom member 104. Accordingly, the member 102 is also referred to herein as a short fold while the member 104 is also referred to herein as a long fold. They are also referred to herein as the top fold and the bottom fold respectively. As used herein, the tube 106 is said to connect the top and bottom members 102-104 even when the retaining clip 100 is made from an integral piece of material.

Figure 2:
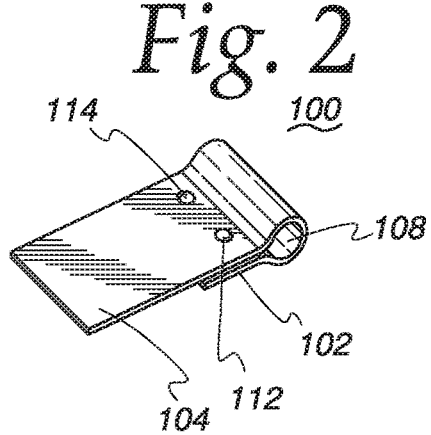
FIG. 2 is a bottom perspective view of a retaining apparatus in accordance with this disclosure.
Figure 3A:
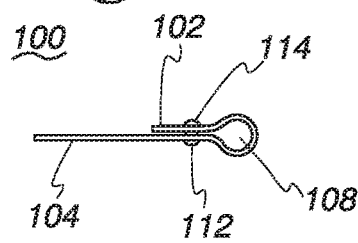
FIG. 3A is a right side view of a retaining apparatus in accordance with this disclosure.
Figure 3B:
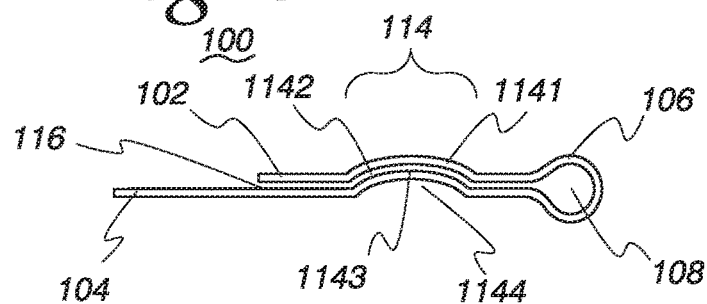
FIG. 3B is a cross-sectional view of a retaining apparatus in accordance with this disclosure.

A bottom perspective view of the retaining clip 100 is shown in FIG. 2. FIG. 3A shows a side view of the retaining clip 100. A cross-sectional view of the retaining apparatus 100 is shown in FIG. 3B. Referring now to FIG. 3B, the space between the short and long folds 102-104 is indicated at 116. Since the short and long folds 102-104 are not welded together, the small space 116 is created when the clip 100 is made. The folds 102-104 are parallel or substantially parallel to each other. As used herein, the folds 102-104 are said to be parallel folds. The small space 116 is adapted to receive an object, such as an aluminum window cladding, when the object is inserted into the space 116. The folds 102-104 face each other.

The enhanced engaging mechanism 114 includes a bulge 1141 extending upward from the top surface of the short fold 102 and a second bulge 1143 extending upward from the top surface of the long fold 104. The bulge 1141 corresponds to a recess 1142 present on the bottom surface of the short fold 102. The bulge 1143 corresponds to a recess 1144 present on the bottom surface of the long fold 104. The bulge 1143 is substantially disposed within the recess 1142. The enhanced engaging mechanism 114 thus includes the bulges 1141 and 1143 and the recesses 1142 and 1144. The bulges 1141 and 1143 and the recesses 1142 and 1144 are in the same or substantially the same shape and dimension. In such a case, the bulges 1141 and 1143 said to be identical bulges, the recesses 1142 and 1144 are said to be identical recesses.

Similarly, the enhanced engaging mechanism 112 includes two bulges and two corresponding recesses. Different from the bulges and recesses 1141-1144 of the enhanced engaging mechanism 114, the bulges and recesses of the enhanced engaging mechanism 112 extend and point downward. As used herein, the enhanced engaging mechanism 112 is said to be female enhanced engaging mechanism while the enhanced engaging mechanism 114 is said to be a male enhanced engaging mechanism. In one implementation, the enhanced engaging mechanisms 112-114 have the same or substantially same shape and dimension. Alternatively, they are of different shapes and/or dimensions without deviating from the present teachings. In either case, the bulge 1141 and the recess 1142 have the same or substantially the same shape, dimension and direction; and the bulge 1143 and the recess 1143 have the same or substantially the same shape, dimension and direction. Furthermore, the bulge 1143 extend toward the recess 1142. Accordingly, as used herein, the bulge 1141, the recess 1142, the bulge 1143 and the recess 1144 are said to correspond to each other, and are corresponding bulges and recesses.

After an object in inserted into the space 116, the object is pushed against by the bulge 1143 toward the recess 1142. The pushing force thus enhances the griping force of the retaining clip 100 on the inserted object. In one implementation, the recess 1142 receives substantially the entirety or at least a portion of the bulge 1143. In a different implementation, the recess 1142 does not receive a portion of the bulge 1151.

Figure 3C:
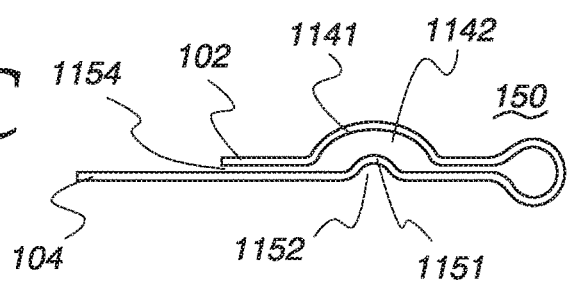
FIG. 3C is a cross-sectional view of a retaining apparatus in accordance with this disclosure.

Alternatively, the bulge 1141 and 1143 are not identical and the recesses 1142 and 1144 are not identical either. Such an embodiment is further illustrated in FIG. 3C. Referring now to FIG. 3C, a retaining clip is shown and generally indicated at 150. The retaining apparatus 150 includes a smaller bulge 1151 and a corresponding recess 1152. The bulge 1151 and the recess 1152 are each smaller than the bulge 1141 and the recess 1142 respectively. The smaller bulge 1151 makes the insertion of an object, such as an aluminum window cladding, into the space 1154 between the short and long folds 102-104 easier. However, the smaller bulge 1151 also reduces the griping force of the retaining clip 150 on the inserted object. In one implementation, the recess 1142 receives a portion of the bulge 1151. In a different implementation, the recess 1142 does not receive a portion of the bulge 1151. Furthermore, as used herein, the bulge 1141, the recess 1142, the bulge 1151 and the recess 1152 are said to correspond to each other, and are corresponding bulges and recesses. As shown in FIG. 3C, the bulge 1151 does not incorporate or surround a hole or an opening. As used herein, it is said that the bulge 1151 does not incorporate an opening. The same is true with the bulge 1141. As shown in FIG. 3B, neither the bulge 1141 nor the bulge 1143 incorporates an opening.

In one implementation, the bulges 1141, 1143 and 1151, and the recesses 1142, 1144 and 1154 are spherical in shape. They can also be in other shapes, such as oval. However, for easy insertion of an object into the fold spaces 116 and 1154, the bulges 1141, 1143 and 1151 each incorporate a smooth surface.

In the illustrative embodiment of FIG. 1, the bulge 1141 extends upward from the top surface of the short fold 102. In other words, the enhanced engaging mechanism 114 extends upward from the retaining clip 100. Accordingly, the enhanced engaging mechanism 114 is said to be a male enhanced engaging mechanism. In contrast, the enhanced engaging mechanism 112 extends downward and away from the retaining apparatus 100. Accordingly, the enhanced engaging mechanism 112 is said to be a female enhanced engaging mechanism. With the enhanced engaging mechanisms 112-114 being female and male respectively, the enhanced engaging mechanism 114 pushes the object inserted into the fold space 116 upward while the enhanced engaging mechanism 112 pushes the object downward. The direct benefit of this configuration is increased grip of the object than when the two enhanced engaging mechanisms 112-114 are in the same direction (meaning both are female or both are male). Alternatively, the two enhanced engaging mechanisms 112-114 are configured in the same direction without deviating from the present teachings.

In one embodiment, the retaining clip 100 is made of stainless steel. Stainless steel provides advantages over many other types of materials for resisting erosion and rusting. In addition, stainless steel provides strong rigidity. In one implementation, the retaining clip 100 is made by folding a sheet of stainless steel along a rod before the members 102-104 are pressed toward each other to form the channel 108 and the tube 106. Thereafter, the members 102-104 are struck from the top direction to form the enhanced engaging mechanism 112, and the bottom direction to form the enhanced engaging mechanism 114. The enhanced engaging mechanisms 112-144 can be formed at the same time or at different times. In one particular implementation, the members 102-104 are about 15 mm (meaning millimeters) wide; the member 102 is about 6 mm long; the member 104 is about 22 mm long; and the diameter of the tube 106 is about 3 mm. The dimensions can be different depending on particular applications of the present invention. The channel 108 is enclosed by the tube 106 in approximately three hundred sixty degrees, such as three hundred fifty degrees, three hundred fifty two degrees, or three hundred forth five degrees. As used herein, the channel 108 is said to be enclosed by the tube 106 in approximately three hundred sixty degrees. The channel 108 is also said herein to be of approximately three hundred sixty degrees. The channel 108 is approximately cylindrical in shape.

Figure 4:
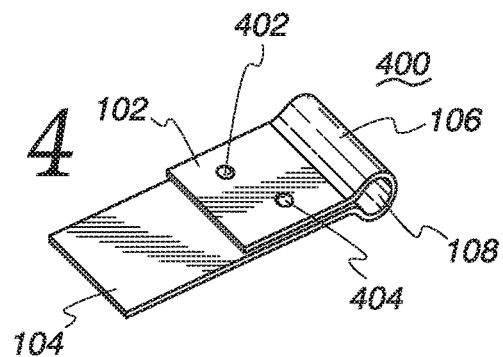
FIG. 4 is a front perspective view of a retaining apparatus in accordance with this disclosure.

In one implementation, a virtual line running through the enhanced engaging mechanisms 112-114 is parallel or substantially parallel to the channel 108. In such a case, the enhanced engaging mechanisms 112-114 are said to be parallel. Alternatively, as shown FIG. 4, the enhanced engaging mechanisms are not parallel. Turning to FIG. 4, a front perspective view of a retaining apparatus is shown and generally indicated at 400. The retaining clip 400 includes two enhanced engaging mechanisms 402 and 404. A virtual line running through the female mechanism 404 and the male mechanism 402 is not parallel to the tube 106. In such a case, the enhanced engaging mechanisms 402-404 are said to be unparallel. Compared to the parallel enhanced engaging mechanisms 112-114, the unparallel enhanced engaging mechanisms 402-404 makes the insertion of an object into the fold space between folds 102-104 easier because the object overcomes the bulges of the mechanisms 402-404 at different time during the insertion.

Figure 5:
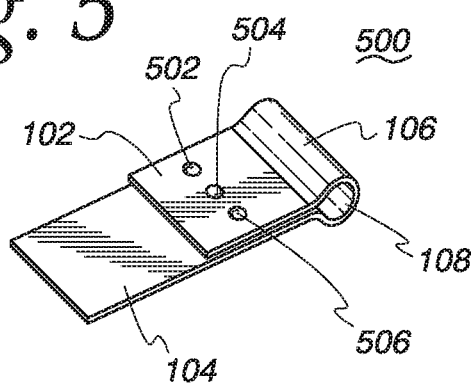
FIG. 5 is a front perspective view of a retaining apparatus in accordance with this disclosure.
Figure 6:
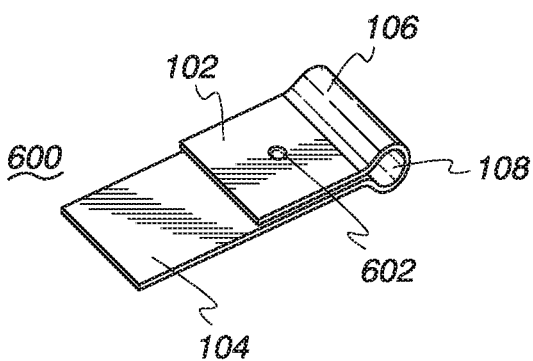
FIG. 6 is a front perspective view of a retaining apparatus in accordance with this disclosure.

The retaining apparatuses 100 and 400 each incorporate two enhanced engaging mechanisms. In accordance with the present teachings, the new retaining apparatus can incorporate one, three or more enhanced engaging mechanisms without deviating from the present teachings. Referring now to FIG. 5, a front perspective view of a retaining clip is shown and generally indicated at 500. The retaining clip 500 includes three enhanced engaging mechanisms 502, 504 and 506. A retaining clip with only one enhanced engaging mechanism is shown in FIG. 6 and generally indicated at 600. The retaining clip 600 incorporate a single enhanced engaging mechanism 602.

Figure 7:
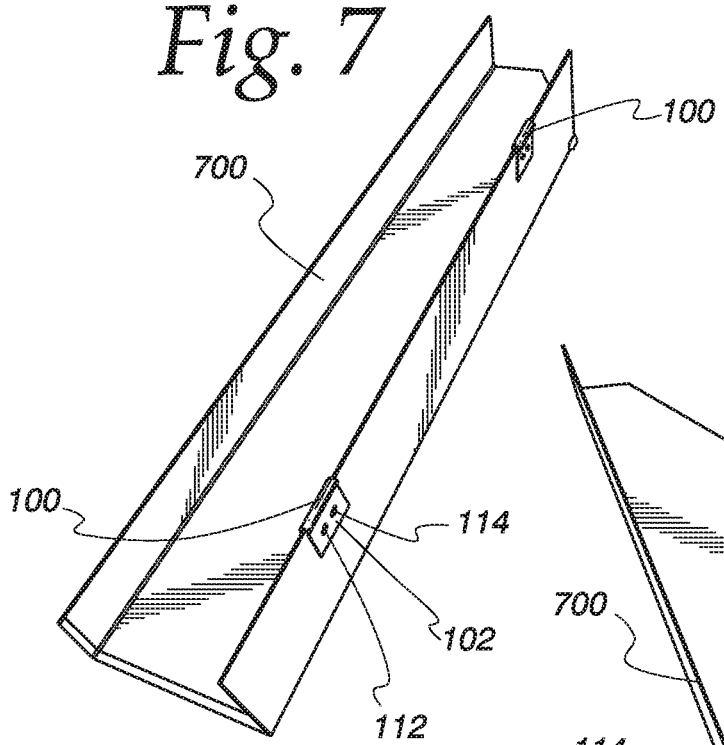
FIG. 7 is a front perspective view of a window cladding with two retaining apparatuses attached in accordance with this disclosure.
Figure 8:
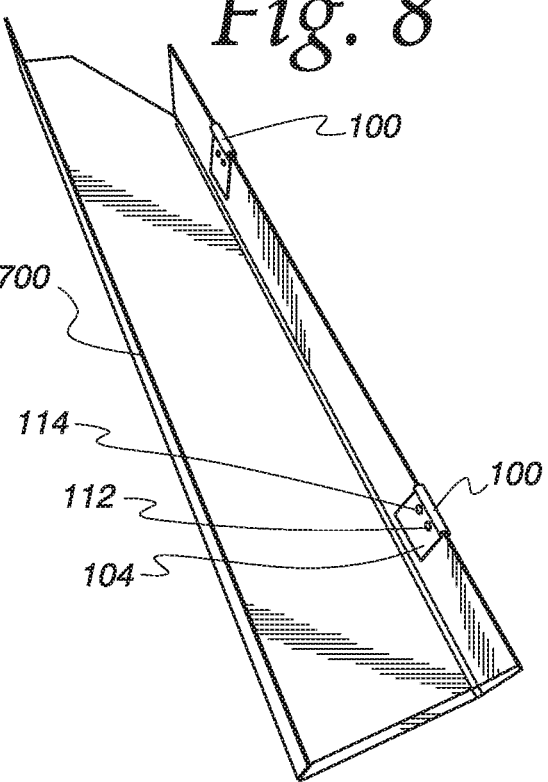
FIG. 8 is a rear perspective view of a window cladding with two retaining apparatuses attached in accordance with this disclosure.

Referring now to FIGS. 7 and 8, perspective views of an aluminum window cladding 700 with two retaining clips 100 attached are shown. The aluminum window cladding 700 can be, for example, custom made to fit the dimensions of a particular window. One side of the cladding 700 is inserted into the space 116 of the retaining clips 100. The edge of the cladding 700 can reach and be received by the empty channel 108. The rigidity of the retaining clips 100 firmly attaches the clips 100 to the cladding 700. The enhanced engaging mechanisms 112-114 further increases the gripping.

Figure 9:
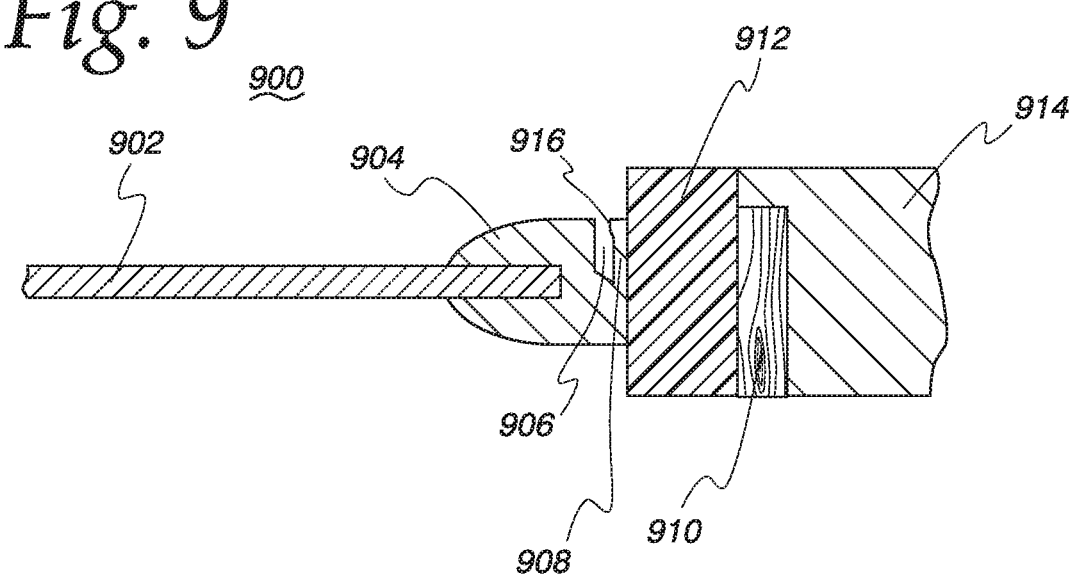
FIG. 9 is a cross-sectional view of a window and a building wall in accordance with this disclosure.

Referring now to FIG. 9, a simplified and partial cross-sectional view of a window and wall of building, such as a residential house, is shown and generally indicated at 900. The building 900 includes a window glass 902, a window glass attachment assembly 904, a window frame 912, a beam 910 and a wall 914. The window glass attachment assembly 904 is mounted to the window frame 912, the beam 910, or a different part of the structure of the building. At least one side of the window frame 912 is exposed to different weather factors. The window glass attachment assembly 904 incorporates a utility groove 906 and a flexible wall 908. The flexible wall 908 has a limited range of flexibility. It also incorporates a lip 916.

Figure 10:
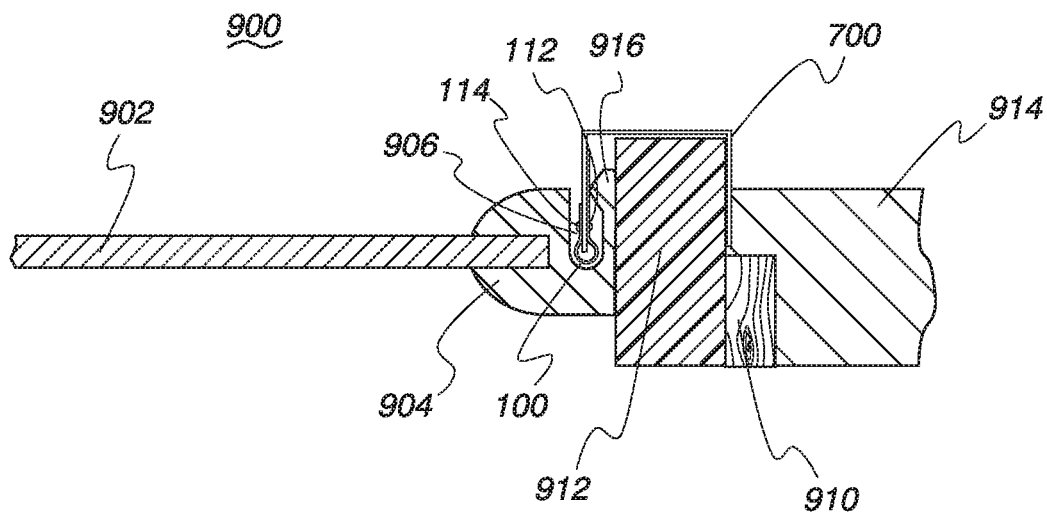
FIG. 10 is a cross-sectional view of a window and a building wall with a window cladding having two attached retaining apparatuses in accordance with this disclosure.

Turning to FIG. 10, a simplified cross-sectional view of the building 900 with the window cladding 700 attached is shown. The side of the window cladding 700 with the two retaining clips 100 is inserted into the utility groove 906. The tubes 106 of the two retaining clips 100 are pushed into the groove 906 by overcoming the lip 916. The tube 106 is configured with a particular dimension such that a user can push the window cladding 700 with the retaining clips 100 into the groove 906 by hand. Once the window cladding 700 is attached, it covers the window frame 912, and the lip 916 keeps the window cladding 700 in place since the lip 916 blocks the tubes 106 from leaving the groove 906.

When the window cladding 700 needs to be removed for, for example, replacement or repair, a user can pull the window cladding 700 with the retaining clips 100 away from the groove 906. When the window cladding 700 is pulled outward, the tube 106 overcomes the resistance of the lip 916. In such a case, the strong gripping force of the retaining clips 100 allows them to be pulled out of the groove 906 along with the window cladding 700. Even if a retaining clip 100 is left inside the groove 906, the user can easily pull it out using, for example, a plier.

Obviously, many additional modifications and variations of the present disclosure are possible in light of the above teachings. Thus, it is to be understood that, within the scope of the appended claims, the disclosure may be practiced otherwise than is specifically described above. For example, the retaining clips 100, 400, 500 and 600 can be made of other types of materials, such as composite materials with desirable physical properties to resist erosion and provide strong rigidity.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A retaining clip for attaching a window cladding to a window of a building, said retaining clip comprising:
   1) a short fold;
   2) a long fold facing said short fold in a parallel orientation;
   3) a tube connecting said short fold and said long fold, said tube enclosing a channel of approximately three hundred sixty degrees;
   4) a female enhanced engaging mechanism including a first bulge and a first recess in said short fold, and a second bulge and a second recess in said long fold, said second recess receiving a portion of said first bulge, wherein said first bulge, said first recess, said second bulge and said second recess are corresponding bulges and recesses; and
   5) a male enhanced engaging mechanism including a third bulge and a third recess in said short fold, a fourth bulge and a fourth recess in said long fold, said third recess receiving a portion of said fourth bulge, wherein:
      a) said first bulge and said third bulge extend away from said retaining clip in opposite directions; and
      b) said third bulge, said third recess, said fourth bulge and said fourth recess are corresponding bulges and recesses.

2. The retaining clip of claim 1, wherein said female enhanced engaging mechanism and said male enhanced engaging mechanism are parallel enhanced engaging mechanisms.

3. The retaining clip of claim 1, wherein said female enhanced engaging mechanism and said male enhanced engaging mechanism are unparallel enhanced engaging mechanisms.

4. The retaining clip of claim 1, wherein said retaining clip is made of stainless steel.

5. The retaining clip of claim 1, wherein said female enhanced engaging mechanism and said male enhanced engaging mechanism have the same shape and dimension.

6. The retaining clip of claim 1, wherein said first bulge is smaller than said second recess.

7. The retaining clip of claim 1, wherein said fourth bulge is smaller than said third recess.

8. The retaining clip of claim 1, wherein said first bulge, said first recess, said second bulge, said second recess, said third bulge, said third recess, said fourth bulge and said fourth recess are spherical.

9. The retaining clip of claim 1, wherein said channel is approximately cylindrical in shape.

10. A retaining clip for attaching an object to another object of a building, said retaining clip comprising:
    1) a short fold;
    2) a long fold facing said short fold in a parallel orientation;
    3) a tube connecting said short fold and said long fold, said tube enclosing a channel of approximately three hundred sixty degrees, wherein said channel is approximately cylindrical in shape; and
    4) a first enhanced engaging mechanism including a first bulge and a first recess in said short fold, and a second bulge and a second recess in said long fold, wherein said first bulge, said first recess, said second bulge and said second recess are corresponding bulges and recesses, wherein neither said first bulge nor said second bulge incorporates an opening.

11. The retaining clip of claim 10, wherein said retaining clip is made of stainless steel.

12. The retaining clip of claim 10, wherein said first bulge is smaller than said second recess.

13. The retaining clip of claim 10, wherein said first bulge is identical to said second recess.

14. The retaining clip of claim 10, wherein said second recess does not receive a portion of said first bulge.

15. The retaining clip of claim 10 further comprising a second enhanced engaging mechanism including a third bulge and a third recess in said short fold, and a fourth bulge and a fourth recess in said long fold, said third recess receiving a portion of said fourth bulge, wherein said third bulge, said third recess, said fourth bulge and said fourth recess are corresponding bulges and recesses.

16. The retaining clip of claim 15, wherein:
    1) said first enhanced engaging mechanism is a female enhanced engaging mechanism and said second enhanced engaging mechanism is a female enhanced engaging mechanism;
    2) said first enhanced engaging mechanism is a female enhanced engaging mechanism and said second enhanced engaging mechanism is a male enhanced engaging mechanism;
    3) said first enhanced engaging mechanism is a male enhanced engaging mechanism and said second enhanced engaging mechanism is a female enhanced engaging mechanism; or 4) said first enhanced engaging mechanism is a male enhanced engaging mechanism and said second enhanced engaging mechanism is a male enhanced engaging mechanism.

17. The retaining clip of claim 16, wherein said first enhanced engaging mechanism and said second enhanced engaging mechanism are parallel enhanced engaging mechanisms.

18. The retaining clip of claim 16, wherein said first enhanced engaging mechanism and said second enhanced engaging mechanism are unparallel enhanced engaging mechanisms.

19. A retaining clip for attaching an object to another object of a building, said retaining clip comprising:
   1) a short fold;
   2) a long fold facing said short fold in a parallel orientation;
   3) a tube connecting said short fold and said long fold, said tube enclosing a channel of approximately three hundred sixty degrees; and
   4) a first enhanced engaging mechanism including a first bulge and a first recess in said short fold, and a second bulge and a second recess in said long fold, wherein said first bulge, said first recess, said second bulge and said second recess are corresponding bulges and recesses, wherein said second recess receives a portion of said first bulge.

20. The retaining clip of claim 19, wherein said channel is approximately cylindrical in shape.

\* \* \* \* \*